United States Patent
Louchkoff et al.

(10) Patent No.: US 9,325,441 B2
(45) Date of Patent: Apr. 26, 2016

(54) SIGNAL RECEPTION MULTI-TUNER SYSTEM AND CORRESPONDING METHOD

(71) Applicant: THOMSON LICENSING, Issy de Moulineaux (FR)

(72) Inventors: Marc Louchkoff, Janze (FR); Claude Fouque, La Malhoure (FR); Anthony Pesin, Cesson Sevigne (FR)

(73) Assignee: Thomson Licensing (FR)

( * ) Notice: Subject to any disclaimer, the term of this patent is extended or adjusted under 35 U.S.C. 154(b) by 55 days.

(21) Appl. No.: 14/348,917

(22) PCT Filed: Sep. 25, 2012

(86) PCT No.: PCT/EP2012/068857
§ 371 (c)(1),
(2) Date: Apr. 1, 2014

(87) PCT Pub. No.: WO2013/050272
PCT Pub. Date: Apr. 11, 2013

(65) Prior Publication Data
US 2014/0247707 A1    Sep. 4, 2014

(30) Foreign Application Priority Data

Oct. 4, 2011 (FR) ..................... 11 58928

(51) Int. Cl.
*H04J 1/12* (2006.01)
*H04B 1/10* (2006.01)

(52) U.S. Cl.
CPC .. *H04J 1/12* (2013.01); *H04B 1/109* (2013.01)

(58) Field of Classification Search
None
See application file for complete search history.

(56) References Cited

U.S. PATENT DOCUMENTS

| 6,625,435 | B1* | 9/2003 | Ramesh ............... H03L 7/23 455/255 |
|---|---|---|---|
| 7,034,632 | B2 | 4/2006 | Gomez et al. |
| 7,634,028 | B2 | 12/2009 | Crawley |
| 7,634,225 | B2 | 12/2009 | Kawakami et al. |
| 7,904,024 | B2 | 3/2011 | Dessert et al. |
| 2004/0037370 | A1* | 2/2004 | Mori et al. ................ 375/322 |
| 2004/0250284 | A1 | 12/2004 | Dong et al. |
| 2005/0003773 | A1* | 1/2005 | Cowley ............... H03J 1/005 455/150.1 |
| 2005/0260961 | A1* | 11/2005 | Cowley ............... H04H 40/18 455/191.1 |
| 2006/0068708 | A1 | 3/2006 | Dessert et al. |
| 2006/0089114 | A1* | 4/2006 | Maxim ............... H03D 3/006 455/179.1 |
| 2007/0268961 | A1* | 11/2007 | Lin ................... H03D 3/007 375/152 |

(Continued)

FOREIGN PATENT DOCUMENTS

EP    1317073    6/2003
KR    957257    10/2003

(Continued)

*Primary Examiner* — Otis L Thompson, Jr.
(74) *Attorney, Agent, or Firm* — Jack Schwartz & Associates, PLLC (57) ABSTRACT

A Multi-tuner reception system includes at least a first tuner and a second tuner. The first tuner is adapted to translate a frequency of a first received signal into a first translated frequency. The first tuner includes a first local oscillator operating at a first local oscillator frequency. The second tuner is adapted to translate a frequency of a second received signal into a second translated frequency. The second tuner includes a second local oscillator operating at a second local oscillator frequency. The second local oscillator frequency is equal to a sum of the first local oscillator frequency and a continually time variable offset frequency.

22 Claims, 5 Drawing Sheets

(56) References Cited

U.S. PATENT DOCUMENTS

| | | | |
|---|---|---|---|
| 2008/0176523 A1* | 7/2008 | Sutton | H04B 1/0475 455/76 |
| 2009/0061759 A1* | 3/2009 | Stoddard et al. | 455/1 |
| 2009/0302966 A1 | 12/2009 | Ibrahim et al. | |
| 2010/0054377 A1* | 3/2010 | Havener | 375/344 |
| 2010/0323635 A1 | 12/2010 | Steeper et al. | |
| 2011/0244812 A1* | 10/2011 | Cowley | H04B 1/10 455/77 |
| 2012/0062285 A1* | 3/2012 | Allott | H03D 7/1466 327/145 |

FOREIGN PATENT DOCUMENTS

| | | |
|---|---|---|
| KR | 2008049933 | 6/2008 |
| KR | 2009007007 | 1/2009 |
| WO | WO9832233 | 7/1998 |
| WO | WO2007092298 | 8/2007 |
| WO | WO2008148125 | 12/2008 |
| WO | WO2011/005382 | 1/2011 |

* cited by examiner

SIGNAL RECEPTION MULTI-TUNER SYSTEM AND CORRESPONDING METHOD

This application claims the benefit, under 35 U.S.C. §365 of International Application PCT/EP2012/068857, filed Sep. 25, 2012, which was published in accordance with PCT Article 21(2) on Apr. 11, 2013 and which claims the benefit of French patent application No. 1158928 filed Oct. 4, 2011.

1. DOMAIN OF THE INVENTION

The invention relates to the domain of data receiver devices comprising several tuners and more specifically to the reduction of crosstalk between the tuners.

2. PRIOR ART

Multi-tuner receivers are used particularly for the reception of several audiovisual programmes via, for example, terrestrial and satellite transmission channels.

Each of the tuners enables selection of a signal carrier frequency within a frequency band in order to demodulate the signal and process it.

Whatever the input architecture of a multi-tuner receiver there is a significant disadvantage. Electromagnetic emissions exist between the tuners and can create interferences. This phenomenon is known as crosstalk.

The problem of crosstalk occurs more specifically when two tuners are tuned onto the same conversion frequency, called LO (Local Oscillator). The demodulators connected respectively to each of the tuner outputs then experience noticeable reductions in performance for low power levels of the input signal.

The patent application WO2011005382A2 (published under the title "Apparatus and methods for minimizing phase interaction between multiple tuners solutions") describes a method aiming specifically to limit crosstalk between two neighbouring tuners by detecting if the frequency of the local oscillator of a first tuner is equal or close to the frequency of the local oscillator of a second tuner, or if there is a relationship that could lead to interferences between one of the local oscillator frequencies and a harmonic frequency of the other local oscillator. In the case where interference is predicted, a fixed frequency offset is produced on one or other of the tuner local oscillators This method relies on the fact that the demodulation circuits used for processing tuner outgoing signals are capable of functioning normally when the tuner frequency is not perfectly centred on the theoretical frequency of the channel.

The frequency offset of the local oscillator of a tuner that, tuned onto a defined channel, disperses harmonics into a neighbouring tuner enables the harmonics to be significantly reduced and enables two neighbouring tuners to function normally when the typology of the circuit favours a crosstalk phenomenon.

This technique has the disadvantage of being complicated to implement.

3. SUMMARY OF THE INVENTION

The invention enables at least one of the disadvantages of the prior art to be overcome reducing the crosstalk between at least two tuners of a multi-tuner electronic device, while providing a simplicity in implementation. More specifically, the invention relates to a signal reception multi-tuner system, comprising at least a first tuner, a second tuner and a demodulator, the first tuner being adapted to translate a frequency of a first received signal into a first translated frequency, the first tuner comprising a first local oscillator operating at a first local oscillator frequency, the second tuner being adapted to translate a frequency of a second received signal into a second translated frequency, the second tuner comprising a second local oscillator operating at a second local oscillator frequency.

Advantageously, the second local oscillator frequency is equal to the sum of the first local oscillator frequency and a continually time variable offset frequency, the demodulator being adapted to demodulate a signal from the second tuner.

According to an embodiment of the invention, the first tuner and the second tuner are of the same type.

According to an embodiment of the invention, the continually time variable offset frequency depends on a symbol frequency of the second signal received.

According to an embodiment of the invention, the continually time variable offset frequency varies according to a triangular wave form.

According to an embodiment of the invention, the continually time variable offset frequency varies by successive levels.

According to an embodiment of the invention, each of the levels has a duration greater than 4 times a locking time, the locking time being the maximum time between the programming of the second local oscillator frequency of the second local oscillator and the delivery by the second local oscillator of the second local oscillator frequency.

According to an embodiment of the invention, each of the levels has a duration less than 10 times said locking time.

According to an embodiment of the invention, the relationship between the jump in frequency induced by each of said levels and the duration of each of said levels is less than or equal to 7 kHz per second.

The invention also relates to a method for reception of signals in a signal reception multi-tuner system comprising at least a first tuner and a second tuner, the method comprising steps for:
- translating a frequency of a first received signal into a first translated frequency, the first tuner comprising a first local oscillator operating at a first local oscillator frequency,
- translating a frequency of a second received signal into a second translated frequency, the second tuner comprising a second local oscillator operating at a second local oscillator frequency,
- the method being characterized in that the second local oscillator frequency is equal to the sum of the first local oscillator frequency and a continually time variable offset frequency.

According to an embodiment of the invention, the method comprises a step of demodulation of the second signal from the second tuner.

According to an embodiment of the invention, the demodulation step comprises at least one step of transmission of the continually time variable offset frequency to the demodulator.

4. LIST OF FIGURES

The invention will be better understood, and other specific features and advantages will emerge upon reading the following description, the description making reference to the annexed drawings wherein:

FIG. 3b shows details of local oscillator modules LO1 and LO2 implemented in the tuners of FIG. 3a.

5. DETAILED DESCRIPTION OF EMBODIMENTS OF THE INVENTION

It is understood, in the present description of the invention, that the continual variation of the offset frequency described by the expression "continually time variable offset frequency" signifies that one of the two local oscillator frequencies, at least, varies constantly, around a central value, by successive steps for which the duration is sufficiently short so that an interference phenomenon (for example crosstalk) can not occur between the two tuners.

According to a first embodiment, the value of successive steps is the same over time (the amplitude of the steps is constant).

According to an embodiment variant, the step can take several successive values over the time.

The frequency of a local oscillator being most commonly programmed via writing in a register, a "continual" variation consequently corresponds to a series of discrete values. "Continual variation" is defined in contrast to a local oscillator frequency that conserves an identical value for a period of time sufficiently long for an interference phenomenon to arise. In other words, a "continual variation" of a frequency, thus expressed and as described in the context of the present invention, corresponds to a periodic variation for which the period is sufficiently short so that an interference phenomenon can not arise.

It should also be noted that the definition of a frequency equal to the sum of a fixed frequency and a variable frequency enables the variations relating to one local oscillator frequency to be understood with respect to the other, this does not systematically imply that a sum must be carried out prior to each reprogramming of the second local oscillator frequency, but that it continually varies around (or above or below) a fixed value defined from the first local oscillator frequency.

Figure 2:
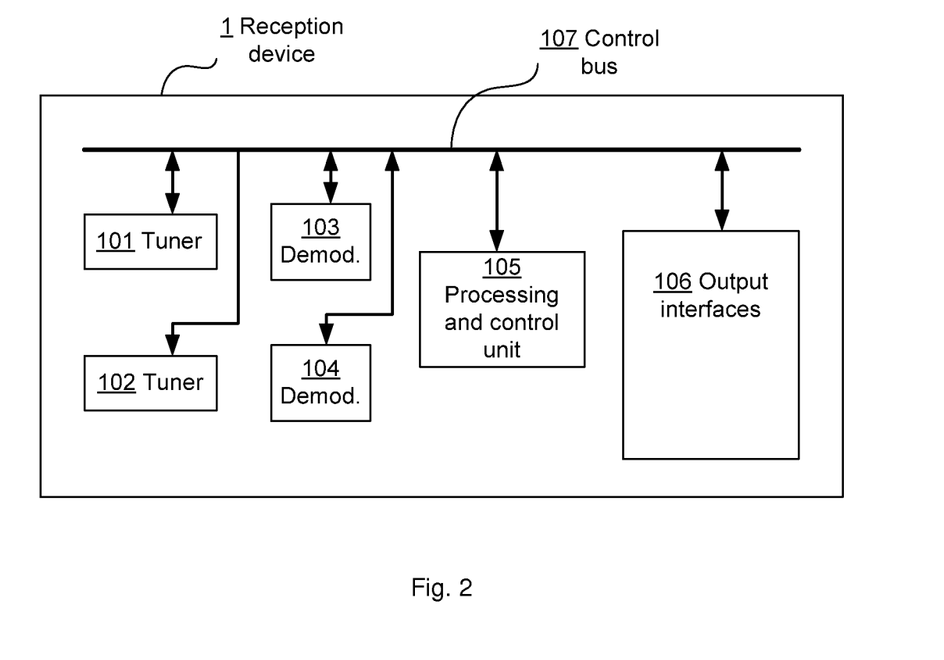
FIG. 2 shows a receiver/decoder type reception device with two tuners, as used by the reception system shown in FIG. 1.
Figure 3A:
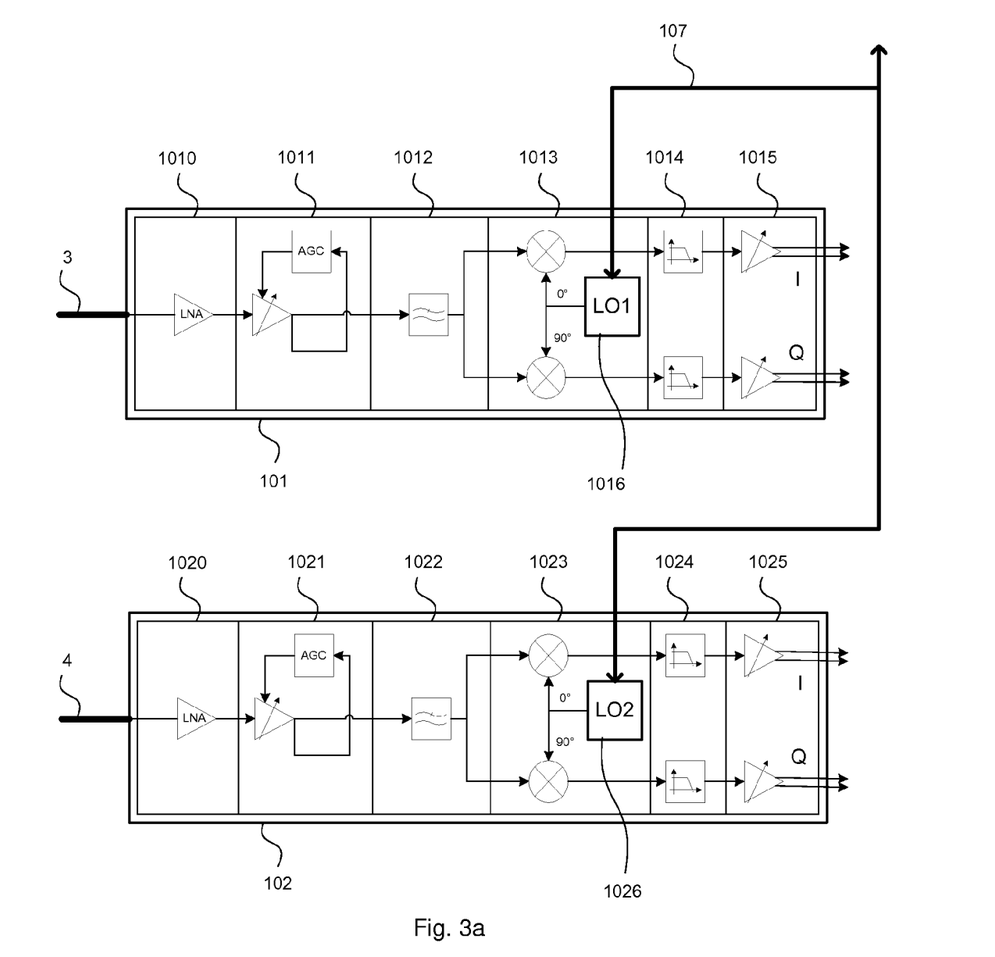
FIG. 3a shows details of the architecture of tuners of the reception device described in FIG. 2.
Figure 3B:
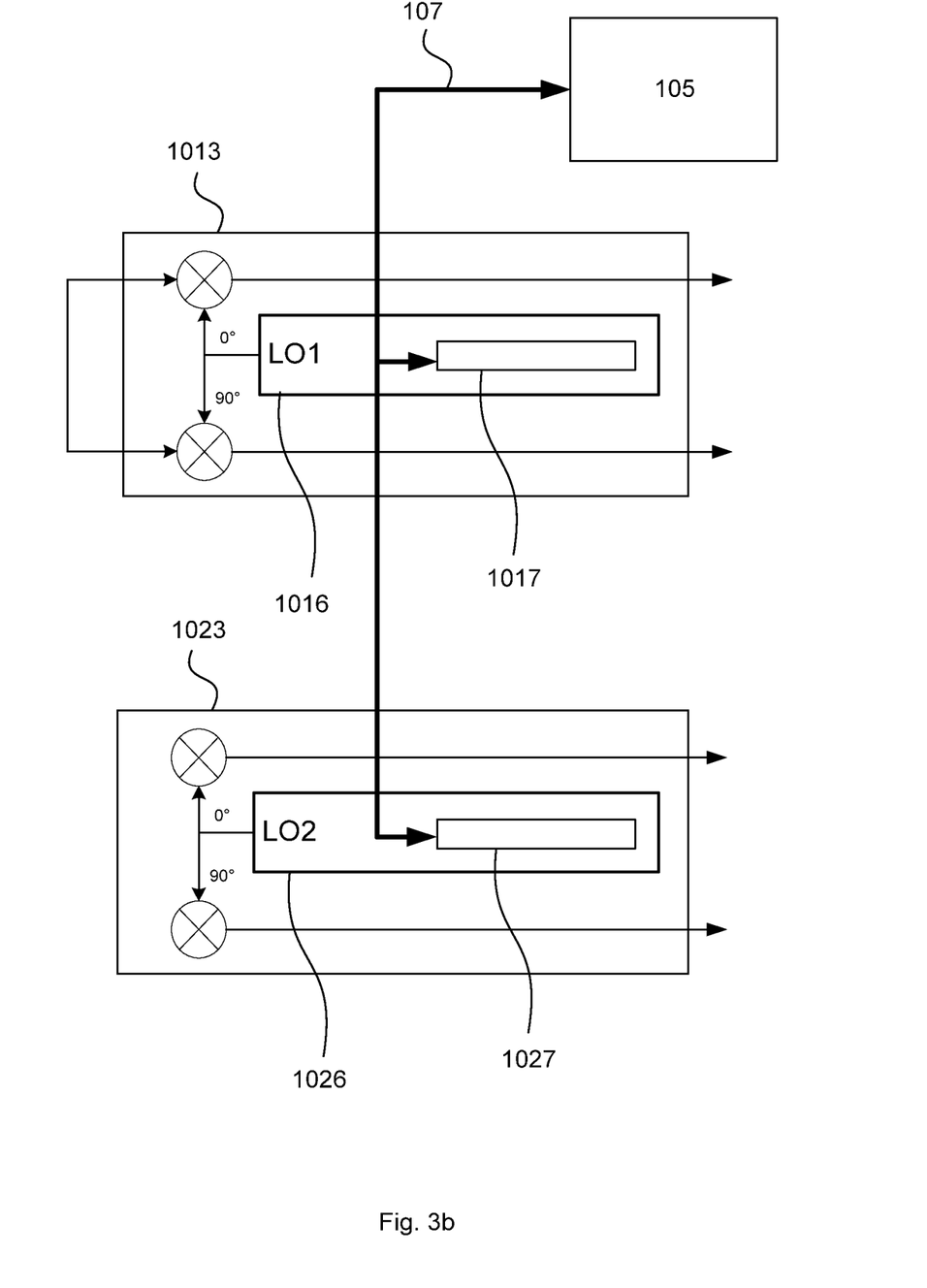

In FIGS. 2, 3a and 3b, the modules shown are functional units that may or may not correspond to physically distinguishable units. For example, these modules or some of them can be grouped together in a single component, or constitute functions of the same software. Conversely, according to other embodiments, some modules are composed of separate physical entities.

In a general but non-restrictive way, the invention relates to a system for programmed frequency variation of a local oscillator of a tuner in order to avoid crosstalk with a neighbouring tuner when signals received by the two tuners are carried on a same central frequency.

According to a first embodiment of the invention, the tuners are satellite tuners that do not require an IF (Intermediate Frequency). The frequency of the local oscillator is then the nominal frequency corresponding to the transmission channel of the received signal.

According to another embodiment, when a tuner uses an intermediary frequency, the frequency of the local oscillator is equal to the nominal frequency (theoretical frequency of the transmission channel) to which an intermediary frequency is added.

Figure 1:
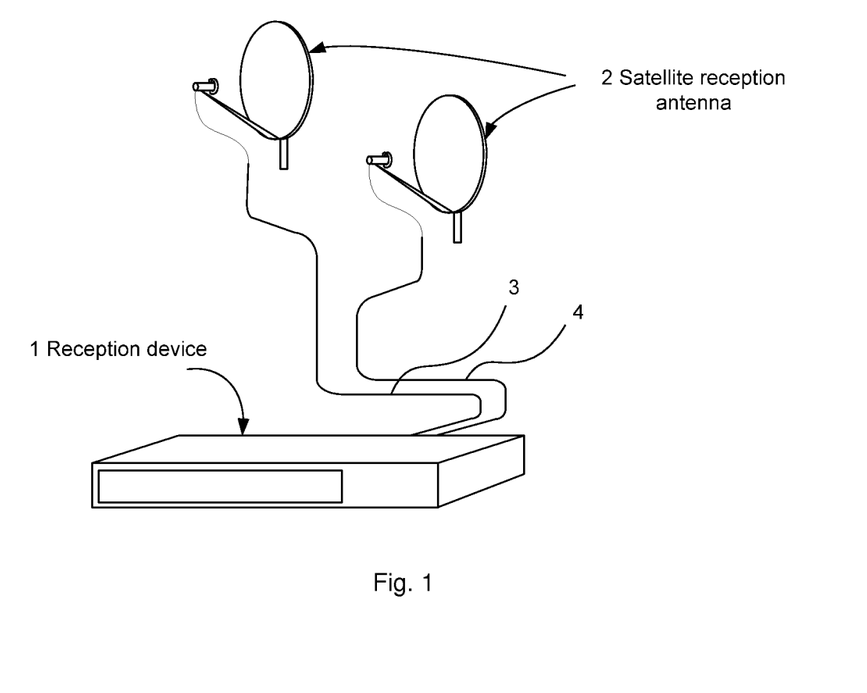
FIG. 1 shows a multi-tuner reception system according to an embodiment of the invention.

FIG. 1 shows a multi-tuner reception system according to the first embodiment of the invention. The system comprises a satellite television reception device 1. The reception device is a receiver/decoder that comprises two independent tuners. The tuners are respectively connected to two satellite reception antennas 2 via the connections 3 and 4.

FIG. 2 shows the reception device 1 according to the first embodiment of the invention. The device comprises a "front-end" 108 and a "back-end" 109. The designation "front-end" designates a set of specific signal reception functions, the designation "back-end" designates, the set of functions ensuring all the other useful processes for the decoding of the received signal and for the restitution of audiovisual programmes, as well as a control logic set and commands of different parts of the device 1. The front-end 108 is of multi-tuner type and has two tuners 101 and 102, respectively associated with two demodulators 103 and 104. The signals received via input connection 3 and 4 are delivered at the output of demodulators 103 and 104 to the control and processing unit 105 that carries out the demultiplexing and the decoding. The decoded audio and video components are then transmitted to the outputs interface module 106 that delivers the signals for the restitution of programmes received on the processing and/or restitution (not shown) device.

The control unit 105 configures the different modules via a control bus 107 and via writing in the configuration register. According to a first embodiment of the invention, the configuration bus 107 is a serial bus I$^2$C (developed by Philips) or another interface bus type such as a parallel bus comprising address, data and control lines.

According to the first embodiment, the tuners 101 and 102 are of identical type. According to variants, the tuners are of different types. By tuner type is understood, the classification of a tuner according to the nature of the signal received (satellite, terrestrial, cable) and the transmission channel. Tuners of the same type are adapted to receive signals of the same nature transmitted over transmission channels having identical characteristics (such as channel width for example). For example a tuner comprising tuners adapted for tuning over a transmission channel via satellite is defined as being of "satellite" type. The satellite transmission channel belongs for example to the frequency band 950 MHz to 2150 MHz. According to an identical reasoning, a tuner comprising tuners adapted for tuning on a transmission channel used for the diffusion of terrestrial digital television (TNT) is defined as being of "terrestrial" type.

To say that the tuners 101 and 102 are of identical type is equivalent to saying, for example that the tuner 101 is a tuner of "satellite" type and the tuner 102 is also a tuner of "satellite" type. The example of a tuner 101 of "satellite" type and a tuner 102 of "terrestrial" type is equivalent to saying that the tuners 101 and 102 are of different types.

FIG. 3a shows the architecture of tuners 101 and 102 used in the reception device 1. According to the first embodiment of the invention, the two tuners 101 and 102 are identical and each dedicated to the reception of a signal from a satellite transponder over a frequency band from 950 to 2150 MHz. According to other embodiments of the invention, the device 1 comprises two different tuners such as for example a satellite tuner and a terrestrial tuner.

The tuner 101 comprises an LNA 1010 (Low Noise Amplifier) that guarantees a good signal level at input while preserving the quality of the received signal. The signal is then processed by an AGC (Automatic Gain Control) module 1011 carrying out an automatic adjustment of the gain on the signal. The signal is then filtered by a filtering module 1012 that filters a frequency band around the central balancing frequency of the tuner 101 and enables the wide-band non-linearity characteristics of the tuner 101 to be improved while carrying out a rejection of second and third harmonics problems of the local oscillator. This filter is sometimes called the "image channel filter" or the "anti H2 H3 filter". The signal thus filtered is then transmitted to a local oscillator module 1013 comprising a local oscillator 1016 referred to as LO1 in the remainder of the present document. The signal is then mixed with the signal from the local oscillator 1016 into two distinct branches to separate the components I and Q, the in-phase component and the quadrature component, used for the digital modulation in a satellite transmission. The first branch, that enables the component I to be extracted, mixes the signal to the local oscillator signal with a phase of 0° while the second branch, used for the extraction of the component Q, mixes the signal to the local oscillator signal with a phase of 90°. Each of the components I and Q is then filtered by a low-pass filtering module 1014 before being transmitted to the output module 1015. The output module formats the components I and Q in order to deliver them in differential format, thus ensuring a better immunity to the noise and interferences that can reach the transmission lines to the demodulation module exterior to the tuner (not shown here). In addition, the output module itself also contains an AGC that enables the components I and Q to be delivered with stable levels for input to the demodulator associated with the tuner 101.

The architecture of the tuner 102 is, according to the embodiment of the invention, similar to that of the tuner 101. The tuner 102 comprises an LNA module 1020, an AGC module 1021, a filtering module 1022, an OL module 1023, a low-pass filtering module 1024 and an output module 1025 similar to the elements 1010 to 1016 of the tuner 101. The local oscillator module 1023 comprises a local oscillator LO2 1026.

The local oscillator modules 1016 and 1026 each comprise a register of the configuration of the local oscillator frequency (again called central frequency). Thus, the control unit 105 configures the tuners 101 and 102 in terms of their respective tuning by writing of values corresponding to the frequencies of local oscillators LO1 and LO2 in the registers of modules 1013 and 1023. The writing in the register of the local oscillator of the value corresponding to the frequency to be delivered (by the local oscillator) is called programming of a local oscillator.

In the remainder of the description, $f_oLO1$ will be referred to as the central frequency of the local oscillator LO1 and $f_oLO2$ as the central frequency of the local oscillator LO2.

In addition fLO1 will be referred to as the programmed frequency in the local oscillator module 1016 of the tuner 101 and fLO2 as the programmed frequency in the local oscillator module 1026 of the tuner 102.

In the case of the use of tuners O-IF (tuners without intermediary frequency), which is the case in the embodiment described, the central frequencies $f_oLO1$ and $f_oLO2$ correspond to the frequencies of transmission channels that carry the signals received. The programmed frequencies fLO1 and fLO2 correspond to the values written by the control units 105 in the registers of local oscillator modules 1013 & 1023, via the control bus 107.

FIG. 3b shows the local oscillator modules LO1 1013 and LO2 1023 that comprise respectively local oscillator frequency configuration registers 1017 (for LO1) and 1027 (for LO2).

The registers 1017 and 1027 are configured by the control and processing unit 105 via the control bus 107.

Figure 4:
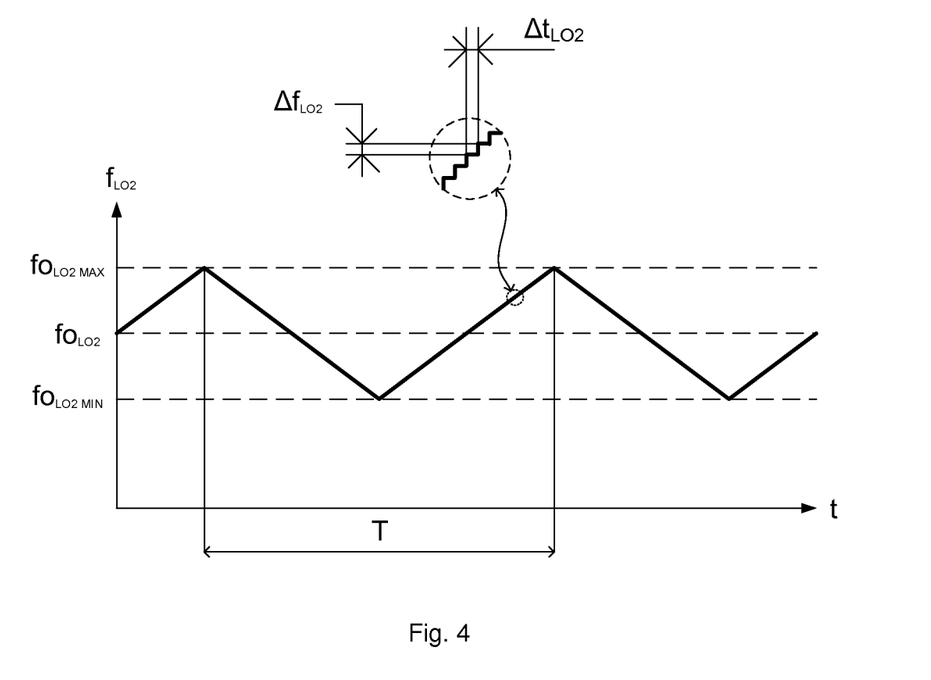
FIG. 4 shows a variation of the frequency of the local oscillator of a second tuner of the receiver/decoder device according to an embodiment of the invention.

FIG. 4 shows the variation of the programmed frequency fLO2 of the local oscillator LO2 of the module 1026 according to a first embodiment of the invention, when the two tuners 101 and 102 receive signals carried by channels of identical frequency. The control unit 105, detects the equality of frequencies of received channels and adds to the frequency of the local oscillator LO2 a continually time variable offset frequency in order to simply avoid crosstalk.

The time variable offset frequency which, added to the frequency of the second local oscillator creates an offset frequency is thus the difference in absolute value of frequencies $f_oLO2$ and fLO2, or respectively between the frequency of the transmission channel that carries the signal received by the second tuner (tuner 102) and the programmed frequency of the second local oscillator of the second tuner (still tuner 102). Thus the first local oscillator operates at a first local oscillator frequency and the second local oscillator operates at a second local oscillator frequency. The second local oscillator frequency is equal to the sum of the first local oscillator frequency and a continually time variable offset frequency.

Advantageously, the oscillation frequencies of local oscillators of tuners 101 and 102 are different. The crosstalk phenomena related to the equality of these frequencies or to the proximity of a frequency of an oscillator and a harmonic in the frequency of a neighbouring oscillator are avoided or diminished.

Thus, it is not necessary to evaluate the degradation of performances related to crosstalk induced by the equality of frequencies of oscillators LO1 and LO2 to determine a fixed offset value.

The detection of the equality of frequencies of channels is specifically carried out when there is a modification of one of them, as for example when the user of the reception device 1 requests a change of audiovisual programme in reception.

The variation of the programmed frequency fLO2 is produced by successive levels. The levels corresponding to jumps in frequency of fLO2 after each new writing of a value in the local oscillator frequency configuration register of the local oscillator LO2.

The variation of the frequency of the local oscillator LO2 carries out an excursion around its central frequency $f_oLO2$. The variation is carried out by successive writing entries (iteratively) in the configuration register 1027 of the local oscillator LO2. According to a first embodiment of the invention, the excursion limits are defined in a way that the lower value is equal to $fLO2_{MIN}$ and the higher value is equal to à $fLO2_{MAX}$ where $fLO2_{MIN} = f_oLO2 - k \times Isb$, and $fLO2_{MAX} = f_oLO2 + k \times Isb$, where k is an integer.

Advantageously k is defined so that the maximum value of the excursion in frequency of $fLO_2$ with respect to the central frequency $f_oLO_2$ is less than 10% of $f_{sym}$, the symbol frequency of the channel for a satellite type tuner.

Isb corresponds to the frequency variation induced by modification of the low weight bit of the configuration register 1027 of the local oscillator LO2, it is the elementary step of the PLL (Phase Lock Loop) of the local oscillator LO2.

There is a maximum response time required by the local oscillator LO2 to deliver a stable signal, of frequency equal to the programmed frequency, from the writing in the corresponding register 1027 of the local oscillator module 1023 of the tuner 102. According to the first embodiment of the invention, and in order to respect this constraint, the progression of k is advantageously by unit at a periodicity equal to at least 4 times the maximum response time of the phase lock loop of the local oscillator LO2.

In other words and according to a first embodiment, for each of the levels induced by the writing of a new value of the local oscillator frequency LO2 in the register 1027 of the local oscillator LO2 (thus a different value to that previously written) there is a jump in frequency $\Delta_{fLO2}$ and duration of successive levels $\Delta t_{LO2}$.

The duration $\Delta t_{LO2}$ is close to the maximum acquisition time of the phase lock loop of the local oscillator LO2 while conserving a margin so as not to risk unlocking the loop. The usual maximum time of the local oscillator is 50 ms.

According to a first embodiment $\Delta t_{LO2}$ is defined:

According to the example, $\Delta t_{LO2} = 4 \times 50$ ms=200 ms

Advantageously, to avoid that a crosstalk phenomenon occurs between the local oscillators LO1 and LO2, each of the levels has a maximum duration less than 10 times the maximum acquisition time of the phase lock loop:

$$\Delta t_{LO2} \text{ max} = 10 \times 50 \text{ ms} = 500 \text{ ms}$$

The absolute value of the difference $(f_oLO2-fLO2)$ is the offset frequency. The maximum value of the offset frequency is defined according to the tuner type 102. More specifically, the maximum value of the offset frequency is a function of the symbol frequency of the received signal. According to a first embodiment, the tuner 102 is of "satellite" type and the offset frequency $|(f_oLO2-fLO2)|$ is less than 10% of the symbol frequency of the received signal. According to a variant, the tuner 102 is of "terrestrial" type and the offset frequency is less than 5% of the symbol frequency of the received signal.

More generally, the time variable offset frequency depends on a symbol frequency of the signal received by the tuner 102. In particular, the maximum value of the offset frequency has a predefined value that corresponds to a percentage of the symbol frequency of the signal received by the tuner 102.

According to a first embodiment of the invention, the ratio between the jump in frequency $\Delta_{fLO2}$ induced by the writing of a new value in the register 1027 of the local oscillator LO2 and the duration between two successive writings (the duration of a level) is less than or equal to 7 kHz per second.

If F2 is a value of the frequency $fLO_2$ of LO2 after writing in the register, F1 is the previous value of $fLO_2$, and $\Delta t_{LO2}$ is the time elapsed between two successive writing events in the register 1027 (or the duration of a level), written as:

$$(F2-F1)/\Delta t_{LO2} <= 7 \text{ kHz/s}.$$

Thus the demodulator 104 remains locked on the signal received from the tuner 102.

The graphical representation of the variation of $fLO_2$ corresponds to a triangular wave, according to the first embodiment of the invention.

T represents the complete excursion period of the programmed value of the local oscillator around the central frequency.

According to a second embodiment of the invention, the frequency excursion of the local oscillator can be around a frequency corresponding to the central frequency $f_oLO_2$ to which is added a fixed value and not around the central frequency $f_oLO_2$. If the offset in fixed value is greater than the excursion in one direction (the maximum value of k×lsb), punctual concordance of frequencies of the local oscillator LO1 and LO2 is avoided. The excursion being necessary when $f_oLO_1$ and $f_oLO_2$ are equal values. This addition of a fixed offset in addition to the variable offset can only be considered if the maximum excursion on the margin of the central frequency $f_oLO_2$ of the oscillator LO2 remains within the capacity limits of the demodulator associated with the second tuner 102 following the drift in frequency of the local oscillator LO2.

According to variants, the wave form of the variation of the frequency $fLO_2$ is sinusoidal, in the form of semi-circles, or a form compatible with the conditions so that the tuner 102 and the demodulator 104 remain locked on the received signal.

For example, the maximum jump in frequency of a local oscillator so that the demodulation of a signal received by satellite does not suffer interference is in the order of 7 kHz per second.

Advantageously, according to a third embodiment of the invention, the control unit transmits to the demodulator 104 associated with the tuner 102, a parameter indicating the offset existing between the frequencies $f_oLO2$ (central frequency of the local oscillator LO2) and $fLO2$ (programmed frequency of the local oscillator LO2). The demodulation can be facilitated and be more precise or more reliable.

The demodulator 104 comprises a calculation module of the offset between the frequency of the channel on which the tuner 102 is tuned and the frequency of the signal received at the input to the demodulator. The demodulator calculates this offset using the value of the frequency of the channel on which the tuner is tuned, this frequency itself is transmitted by the control unit 105 at each reconfiguration (such as for example a change of reception channel on the tuner 102 of the device 1).

According to a variant, the demodulator 104 comprises an offset value register. Advantageously, the control unit 105 writes the value of the offset frequency that is the difference between the frequencies $f_oLO2$ (central frequency of the local oscillator LO2) and $fLO2$ (programmed frequency of the local oscillator LO2).

According to another variant the control unit 105 writes the frequency $fLO2$, the programmed frequency of the local oscillator LO2, in a register of the demodulator 104. Thus, the algorithms of energy recovery, of carrier recovery and of demodulation of the received signal are improved and the processing time specific to demodulation is optimised.

Figure 5:
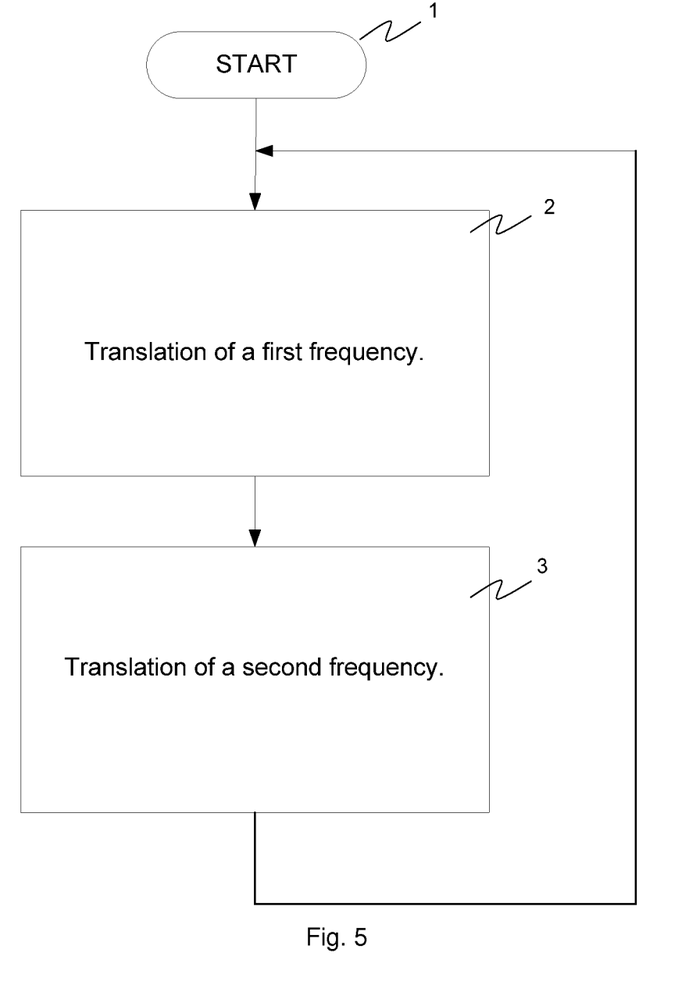
FIG. 5 is a diagram showing a method for controlling local oscillators shown with respect to FIG. 3b.

FIG. 5 is a diagram showing the control method for two local oscillators of tuners 101 and 102.

Step 1 is an initialisation step that corresponds for example to the start-up of the reception device 1. The local oscillators are not controlled and the tuners are not tuned into the channel frequencies.

Step 2 relates to the translating a frequency of a first signal received by a first tuner into a first translated frequency, the first tuner comprising a first local oscillator operating at a first local oscillator frequency.

At step 2, and after a programme has been selected to be received by the tuner 101 of the reception device 1, the control unit 105 writes the value corresponding to the frequency of the local oscillator LO1 in the register 1017 of the local oscillator module 1013. The other configuration registers useful for the configuration of the tuner 101, the demodulator 103 and more widely the device 1 for the reception of a signal on the tuner 101 are configured.

According to a variant, and in the case of the start-up of the reception device 1, the value programmed in the register 1017 of the local oscillator module LO1 can correspond to the value of the local oscillator frequency previously programmed for the reception of the last channel received by the tuner 101, before being turned-off or put on standby.

Step 3 relates to the translating a frequency of a second signal received by a second tuner into a second translated frequency, the second tuner comprising a second local oscillator operating at a second local oscillator frequency. The second local oscillator frequency is equal to the sum of the first local oscillator frequency and a continually time variable offset frequency.

At step 3, following the selection of a programme to be received on the tuner 102 of the device 1 (for example by the user of the reception device 1), the control unit compares the oscillator frequency of the local oscillator LO2 of the channel carrying the signal to be received on the tuner 102 with the frequency of the local oscillator LO1. If the frequencies are identical, the control unit programs the register 1017 of the local oscillator module 1023 according to the frequency of the transmission channel carrying the signal to be received then immediately starts a cycle of successive reprogramming of the frequency of the local oscillator LO2 so that the frequency of the local oscillator LO2 is equal to the sum of the frequency of the local oscillator LO1 and a continually time variable offset frequency. To do this the control unit runs a routine according to an algorithm that enables the programmed frequency fLO2 of the local oscillator LO2 to change around the central frequency of the local oscillator $f_o$LO2 corresponding to the channel to be received. The variation of the frequency fLO2 programmed in the register 1027 of the local oscillator module 1023 is shown in FIG. 4.

The variation is carried out by successive levels. The duration of each of the levels is $\Delta t_{LO2}$ and the jump in frequency fLO2 associated is $\Delta_{fLO2}$.

According to a first embodiment of the invention, the programmed frequency excursion fLO2 around the value $f_o$LO2 is produced only if there is equality of local oscillator frequencies $f_o$LO1 and $f_o$LO2.

According to a variant, the excursion of the frequency $f_o$LO2 is always produced, whatever the channel carrying the signal to be received on the tuner 102.

According to a first embodiment of the invention, the two tuners 101 and 102 each comprise an input for connections 3 and 4.

According to an embodiment variant, the reception device 1 comprise a single input and connections 3 and 4 are established after separation of the input signal into two connections 3 and 4.

The invention previously described is not limited to a satellite television device. In particular, the invention also relates to any system comprising modules implementing the function of tuning and extraction of a signal transmitted on an RF (Radio Frequency) transmission channel and at least two local oscillator modules that can interfere with one another.

The invention applies just as well in the case of use of tuners in modules or tuners integrated in specific circuits, whether the tuners are in distinct integrated circuits or housed in a same integrated circuit.

According to a variant, the variation in time of the frequency of the local oscillator LO2 corresponds to a different wave form to that described previously, such as, for example, a sinusoidal variation or a random variation. The variation of the frequency of LO2 being particularly restricted by the characteristics of the demodulator 104 associated with the tuner 102 and its capacity to demodulate the signal received without interrupting the recovery of data. In particular, this constraint is generally satisfied when the relationship between the jump in frequency induced by each of the levels and the duration of each of the levels is less than or equal to 7 kHz per second.

According to another variant, the invention applies to the reception of data for non-audiovisual applications, such as radio-telephony or the reception of any data over several RF channels in parallel, for which a multi-tuner receiver is useful.

According to another variant, the invention applies to the reception of data by a multi-tuner system comprising more than two tuners (for example 3, 4 or 5 tuners). The variation of the frequencies of local oscillators of tuners occurring in this case in such a way that their respective frequencies are both different.

According to another variant, the frequency of the first local oscillator is equal to the sum of a fixed frequency and a first time variable offset frequency and the frequency of the second local oscillator is equal to the sum of a second fixed frequency and a second time variable offset frequency. Advantageously, the first and second fixed frequencies can be of the same values. The first and second time variable offset frequencies being of different values.

The invention also applies to a method adapted to the system previously described. The method is adapted, according to a first embodiment, to the configuration of a first local oscillator and a second local oscillator, the frequency of the second local oscillator being equal to the sum of the frequency of the first local oscillator and a continually time variable offset frequency.

The invention claimed is:

1. A signal reception multi-tuner system, comprising at least one first tuner, a second tuner and a demodulator, said first tuner being adapted to translate a frequency of a first signal received into a first translated frequency, said first tuner comprising a first local oscillator operating at a first local oscillator frequency, said second tuner being adapted to translate a frequency of a second signal received into a second translated frequency, said second tuner comprising a second local oscillator operating at a second local oscillator frequency, wherein said second local oscillator frequency is equal to a sum of said first local oscillator frequency and a time variable offset frequency, said time variable offset frequency being varied by successive levels, said demodulator being adapted to demodulate a signal from said second tuner.

2. The system according to claim 1, wherein said first tuner and said second tuner are of a same type.

3. The system according to claim 1, wherein said time variable offset frequency depends on a symbol frequency of said second received signal.

4. The system according to claim 1, wherein the time variable offset frequency varies according to a triangular wave form.

5. The system according to claim 1, wherein each of said levels has a duration greater than 4 times a locking time, said locking time being a maximum time between programming of said second local oscillator frequency of said second local oscillator and delivering by said second local oscillator of said second local oscillator frequency.

6. The system according to claim 1, wherein each of said levels has a duration less than 10 times a said locking time, said locking time being a maximum time between programming of said second local oscillator frequency of said second local oscillator and delivering by said second local oscillator of said second local oscillator frequency.

7. The system according to claim 1, wherein a ratio between a jump in frequency induced by each of said levels and a duration of each of said levels is less than or equal to 7 kHz per second.

8. The system according to claim 1, wherein a level of variation of said time variable offset frequency is of a duration able to prevent interference between the first and second tuners.

9. The system according to claim 1, wherein the successive levels of variation have a constant duration.

10. The system according to claim 1, wherein a duration of a level of variation of said time variable offset frequency varies over the successive levels.

11. A method for reception of signals in a signal reception multi-tuner system comprising at least a first tuner and a second tuner, said method comprising:
translating by said first tuner a frequency of a first received signal into a first translated frequency, said first tuner comprising a first local oscillator operating at a first local oscillator frequency;
translating by said second tuner a frequency of a second received signal into a second translated frequency, said second tuner comprising a second local oscillator operating at a second local oscillator frequency, wherein said second local oscillator frequency is equal to a sum of said first local oscillator frequency and a time variable offset frequency, said time variable offset frequency being varied by successive levels.

12. The method according to claim 11, further comprising demodulating said second signal from said second tuner.

13. The method according to claim 12, wherein said demodulating comprises transmitting said time variable offset frequency to a demodulator of said signal reception multi-tuner system.

14. The method according to claim 11, wherein said first tuner and said second tuner are of a same type.

15. The method according to claim 11, wherein said time variable offset frequency depends on a symbol frequency of said second received signal.

16. The method according to claim 11, wherein the time variable offset frequency varies according to a triangular wave form.

17. The method according to claim 11, wherein each of said levels has a duration greater than 4 times a locking time, said locking time being a maximum time between programming of said second local oscillator frequency of said second local oscillator and delivering by said second local oscillator of said second local oscillator frequency.

18. The method according to claim 11, wherein each of said levels has a duration less than 10 times said a locking time, said locking time being a maximum time between programming of said second local oscillator frequency of said second local oscillator and delivering by said second local oscillator of said second local oscillator frequency.

19. The method according to claim 11, wherein a ratio between a jump in frequency induced by each of said levels and a duration of each of said levels is less than or equal to 7 kHz per second.

20. The method according to claim 11, wherein a level of variation of said-time variable offset frequency is of a duration able to prevent interference between the first and second tuners.

21. The method according to claim 11, wherein the successive levels of variation have a constant duration.

22. The method according to claim 11, wherein a duration of a level of variation of said time variable offset frequency varies over the successive levels.

* * * * *